United States Patent [19]

Deyak et al.

[11] 4,069,368

[45] Jan. 17, 1978

[54] WORKABLE AND CURABLE EPOXY-TERMINATED SILANE FILMS

[75] Inventors: Frank L. Deyak, Stillwater; Arthur A. Wegwerth, Maplewood, both of Minn.

[73] Assignee: Minnesota Mining and Manufacturing Company, Saint Paul, Minn.

[21] Appl. No.: 728,859

[22] Filed: Oct. 1, 1976

[51] Int. Cl.$^2$ .................... B32B 27/38; B32B 27/08
[52] U.S. Cl. .................... 428/447; 260/348.41; 260/448.2 B; 260/448.8 R; 427/333; 427/386; 427/387; 428/411; 428/413; 428/420; 428/452; 428/532
[58] Field of Search ........... 428/447, 413, 452, 420, 428/532, 411; 427/333, 386, 387; 260/348 SC, 448.2 B, 448.8 R

[56] References Cited

U.S. PATENT DOCUMENTS

| 3,131,161 | 4/1964 | Nitzsche | 260/37 SB |
|---|---|---|---|
| 3,463,661 | 8/1969 | Benson | 427/333 |
| 3,632,843 | 1/1972 | Allen | 260/2 EC |
| 3,687,879 | 8/1972 | Vasta | 428/447 |
| 3,704,311 | 11/1972 | Koshar | 260/437 R |
| 3,758,531 | 9/1973 | Koshar | 260/481 R |
| 3,758,591 | 9/1973 | Koshar | 260/448 R |
| 3,758,592 | 9/1973 | Koshar | 260/448 R |
| 3,758,593 | 9/1973 | Koshar | 260/448 R |
| 3,842,019 | 10/1974 | Kropp | 260/2 A |
| 3,955,035 | 5/1976 | Ito | 428/413 |

*Primary Examiner*—Ellis Robinson
*Attorney, Agent, or Firm*—Cruzan Alexander; Donald M. Sell; Mark A. Litman

[57] ABSTRACT

Conformable films of abrasion resistant coating materials derived from epoxy-terminated silanes are formed by partially curing the epoxy-terminated silane reaction components to a specific degree. Latent catalyst may be included within the film or subsequently added thereto from an adjacent polymer layer containing additional catalyst.

10 Claims, No Drawings

WORKABLE AND CURABLE EPOXY-TERMINATED SILANE FILMS

It has been desirable for many years to enhance the physical properties of materials, especially synthetic resins, by coating such materials with protective synthetic resins. Oleophilic and hydrophilic properties, electrical or magnetic characteristics, and abrasion resistance are amongst the most common physical attributes enhanced by such coatings. One new class abrasion resistant coatings has been the subject of a number of recent patents and applications. This class of material is polymers obtained by curing epoxy-terminated silanes and is disclosed in U.S. Pat. No. 3,955,035 and U.S. patent application Ser. Nos. 513,116, filed Oct. 8, 1974 now abandoned and 659,527, filed Feb. 19, 1976 now U.S. Pat. No. 4,049,861. Many of the coatings have proven to have excellent abrasion resistant properties.

One problem has arisen in the use of these abrasion resistant coatings, particularly when the coatings have to be shaped as in lenses, molds, or embossed coatings. Many of the catalysts disclosed effect a very rapid cure once blended into the monomer or precondensate of the epoxy-terminated silanes which makes mass processing difficult. The slower acting catalysts require extensive heating (e.g., a few hours) which also makes production line manufacture of the coated materials cumbersome and uneconomical.

One aspect of the present invention is to describe a process for applying an abrasion resistant coating comprising the cured product of an epoxy-terminated silane so that shaping may be readily effected.

One other aspect of the present invention is to describe a process for applying shaped abrasion resistant coatings comprising the cured product of an epoxy-terminated silane.

Another aspect of the present invention is to describe an intermediate coated article wherein the coating itself or the coated article and coating can be subsequently and easily shaped.

The present invention describes a process and an intermediate product wherein the epoxy-terminated silane is polymerized within well defined limits and subsequently treated, during the shaping operation, with additional catalyst to further cure the coating to its final desired state. This subsequent treatment is effected by the use of a latent catalyst within the polymeric, partially cured system, or by including a catalyst between the partially cured coating and its substrate in a softenable binder. These and other techniques will be described herein.

EPOXY-TERMINATED SILANES

The epoxy-terminated silanes useful in the present invention are compounds or materials having polymerizable (preferably terminal) epoxy groups and terminal, polymerizable silane groups, the bridging of these groups being through a non-hydrolyzable aliphatic, aromatic, or aliphatic and aromatic divalent hydrocarbon linkage which may have N and/or O atoms in the linkage chain. The O atoms for example would be within the chain only as ether linkages. These linkage chains may be generally substituted as is well known in the art, as these substituents on the chain do not greatly affect the functional ability of the epoxy-terminated silanes to undergo the essential reactions necessary to polymerization through the siloxane or epoxy terminal groups. Examples of substituents which may be present on the linkage or bridging moieties are groups such as $NO_2$, $CH_3(CH_2)_nCH_2$, methoxy, halogen, etc. In general, in structural formulae appearing within this description of the invention, such substitution of the bridging moieties is implied unless specifically excluded by language such as "unsubstituted divalent hydrocarbon radical".

Examples of preferred epoxy-terminated silanes useful in the practice of this invention are compounds of the general formulae:

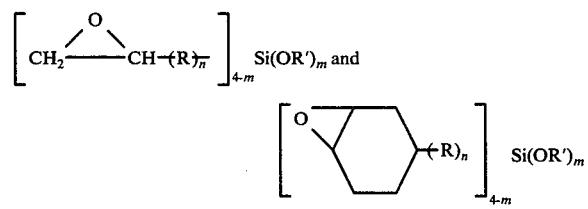

where R = a non-hydrolyzable divalent hydrocarbon radical (aliphatic, aromatic, or aliphatic and aromatic containing) of less than 20 carbon atoms or a divalent radical of less than 20 carbon atoms composed of C, H, N, S, and O atoms (these atoms are the only atoms which may appear in the backbone of the divalent radicals), the last being in the form of ether linkages. No two heteroatoms may be adjacent within the backbone of the divalent hydrocarbon radical. This description defines divalent hydrocarbon radicals for epoxy terminated siloxanes in the practice of this invention. The value of $n$ is from 0 to 1, R' is an aliphatic hydrocarbon radical of less than 10 carbon atoms, an acyl radical of less than 10 carbon atoms, or a radical of formula $(CH_2CH_2O)_kZ$ in which $k$ is an integer of at least 1 and Z is an aliphatic hydrocarbon radical of less than 10 carbon atoms or hydrogen, m has values of 1 to 3.

The compositions employed in this invention can be an epoxy silane of the above formula in which R is any divalent hydrocarbon radical such as methylene, ethylene, decalene, phenylene, cyclohexylene, cyclopentylene, methylcyclohexylene, 2-ethylbutylene, and allene or an ether radical such as

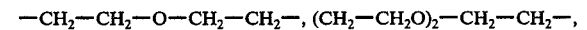
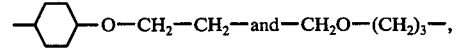

R' can be any aliphatic hydrocarbon radial of less than 10 carbon atoms such as methyl, ethyl, isopropyl, butyl, vinyl, alkyl, or any acyl radical of less than 10 carbon atoms such as formyl, acetyl, propionyl, or any radial of the formula $(CH_2CH_2O)_kZ$ in which $k$ is an integer of at least 1, for example 2, 5, and 8, and Z is hydrogen or any aliphatic hydrocarbon radical of less than 10 carbon atoms such as methyl, ethyl, isopropyl, butyl, vinyl and allyl.

In addition to any of the above silanes the compositions of this invention can be any hydrolyzate or precondensate of the said silanes. These hydrolyzates can be formed by the partial or complete hydrolysis of the silane OR' groups. Thus the term precondensate includes siloxanes in which some or all of the silicon atoms are bonded through oxygen atoms. The following compounds are illustrative of some of useful materials in the process of this invention and should not be construed as limiting the invention which is properly explained above:

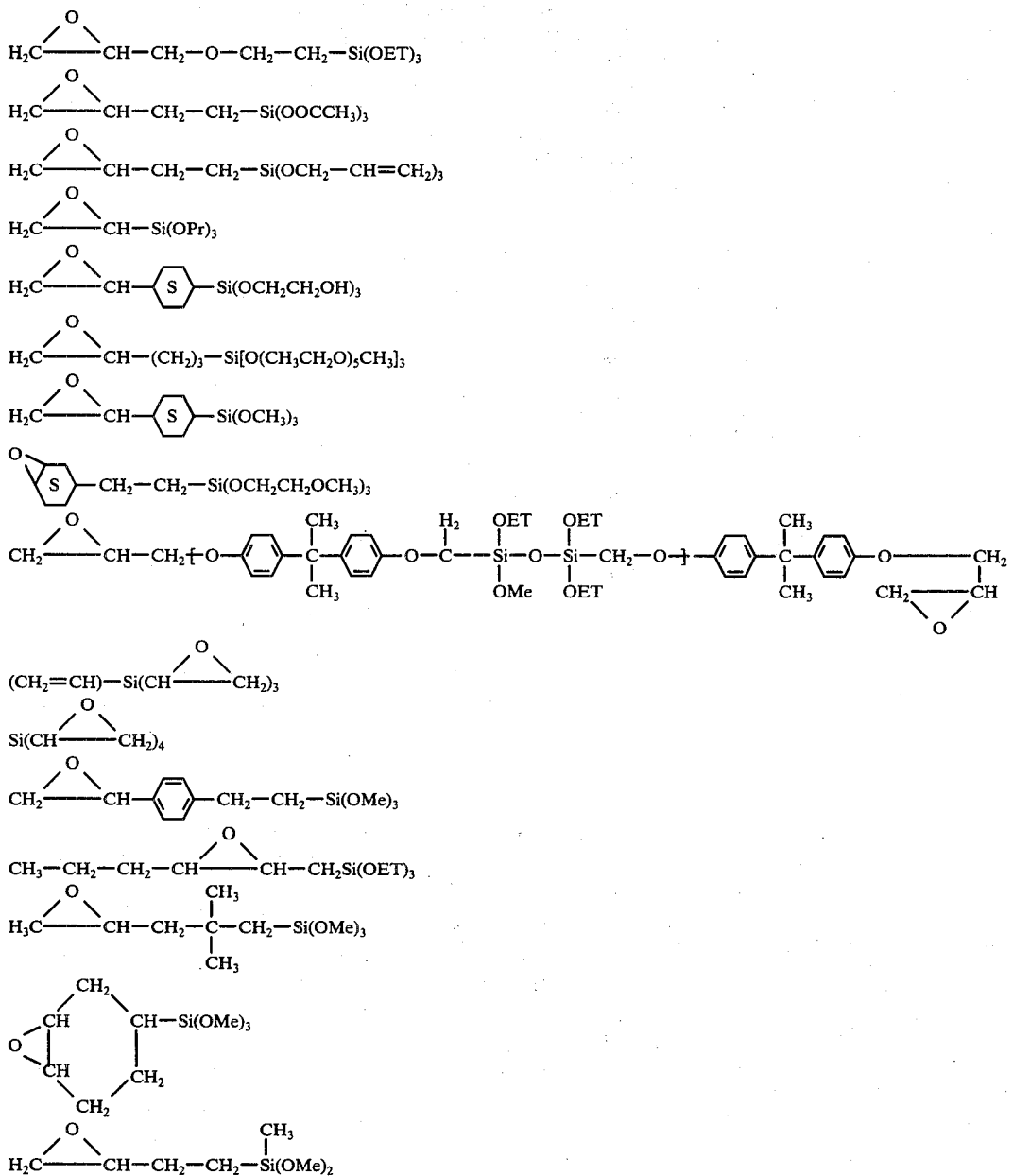

The preparation of most of the above compounds have been described in U.S. Pat. No. 3,131,161.

MOISTURE SENSITIVE COMPOUNDS CAPABLE OF FORMING A TIGHT MATRIX WITH EPOXY-SILANES

These include compounds with the general formula of $R_mM(OR')_n$ in which M is Si, Al, Zr, or Ti, R is a hydrocarbon group of less than 10 carbon atoms or a group composed of hydrogen, carbon and oxygen of less than 20 carbon atoms. R' is an alkyl or acyl group of less than 10 carbon atoms, m has values of 0, 1, 2 and 3 and n correspondingly is 4, 3, 2, or 1. These compounds may be used in a precondensate form or in some instances in the monomeric form. These compounds form a tight matrix with epoxy silanes to give abrasion resistant coatings. The following compounds are illustrative of the type of moisture sensitive materials that can be used in the process of this invention:

$Si(OET)_4$, $CH_3Si(OET)_3$, $(CH_3)_2Si(OET)_2$, $(CH_3)_3Si(OET)$, $(CH_3SCH_2CH_2)_3$—$SiOC_2H_5$, $C_6H_5Si(OET)_3$, $CH_2$=$CHSi(OAC)_3$, $(C_6H_5CH_2SCH_2CH_2)_2Si(OMe)_2$, $CH_3C_6H_5SCH_2(CH_3)CHSi(OC_2H_5)_3$, $CH_2$=$CHCOO(CH_2)_3Si(OCH_3)_3$, $CH_2$=$CH(C_2H_5)COOCH_2Si(OC_2H_5)_3$, $(C_4H_9O)_4Ti$, $Ti(OC_3H_7)_4$, $Al(OC_4H_9)_3$, $(C_2H_5)_2Al(OC_2H_5)$, $(C_3H_7O)_4Zr$.

COMONOMERS

Other copolymerizable materials most useful in the process of this invention are those in which the comonomer is capable of cationic polymerization such as styrene, methyl styrene, vinyl amides and vinyl ethers. The best compounds, however, are the epoxy compounds such as 1,4-butanediol diglycidyl ether, diglycidyl ether of bis-phenol A, and

These compounds may be copolymerized with the epoxy terminated silane. In general all compounds that can be copolymerized with an epoxy or silane functionality are tolerable in the process of this invention.

ADDITIVES

Various additives such as dyestuffs, fine metals, metal oxides, conductive materials, leveling agents, flow control agents, U.V. absorbers, functional materials such as magnetic particles, and many other specific materials which serve a given purpose can be added to the basic resin system to obtain the desired properties.

The intemediate, partially cured coating may be formed by using only small amounts of catalyst or by using weak catalysts that are incapable of completely curing the epoxy-terminated silane. Strong catalysts which must be used in small amounts include the sulfonic and sulfonylic catalysts of U.S. Ser. No. 659,527, filed Feb. 19, 1976, the metal esters of U.S. Ser. No. 513,116, filed Oct. 8, 1974, and the perchloric acid of U.S. Pat. No. 3,955,035. The weaker catalysts include such materials as $BF_3$, $BF_3$ complexes, $SbCl_5$, etc.

The catalyst selected for the final cure may be any of the known catalysts for effecting an abrasion resistant coating, perferably those which are amongst the stronger or more active catalysts, depending upon their manner of application to the partially cured product. For example, none of the active catalysts may be included within the film during cure in such quantities as would completely cure the monomer, but these catalysts in a latent form may be activated during the shaping operation to complete the cure. Active catalysts may be included within the partially cured system only if they are appropriately latentized. By appropriately latentized is meant that the catalysts can be rendered active by some treatment which can be effectively applied to the catalyst, such as heat, radiation (especially ultraviolet radiation or light), or some other activating means which can penetrate into the partially cured coating. Most preferred in the practice of this invention for these latentized catalysts are the salts (e.g., ammonium, organic quaternary ammonium, heterocyclic (e.g., morpholine), and heavy metal) of the highly fluorinated alkyl sulfonyl and highly fluorinated alkyl sulfonic acid catalysts described in the above-mentioned Ser. No. 659,527. These salts are representatively disclosed in U.S. Pat. Nos. 3,758,531; 3,704,311; 3,758,593; 3,758,591; and 3,758,592.

Another outstanding class of latent catalyst would be the diazonium salts of bis(fluorinated alkylsulfonyl) methides of U.S. Pat. Application Ser. No. 353,297 filed Apr. 23, 1973, U.S. Pat. No. 4,039,521. These catalysts would provide a light-sensitive latency to the system. The preferred latent catalysts are those which generate active bis(highly flurorinated alkylsulfonyl)protonic acid or highly fluorinated alkyl sulfonic acid or the anions of those acids.

The partially cured film may have a thermoplastic layer bonded thereto with sufficient catalysts therein that upon heating to a temperature sufficient to allow migration of the catalyst to the partially cured film, the partially cured film will be cured to its desired degree, so that it will not be attacked by dichloromethane, under the above conditions, witbin 10 minutes.

The following examples will further enable an understanding of the present invention.

EXAMPLES 1–52

In the following examples, the monomers were mixed with the latent catalyst then mixed with the appropriate active catalyst in the noted proportions and cured by heating in an air oven for 2 minutes at 65° C. The degree of cure was measured by laying a 4.25 cm circle of Whatman filter paper over the coating, wetting the paper with dichloromethane, covering the wetted paper with a clear plastic dish, then measuring the time for visually observable attack to take place on the surface of the coating. The length of time for tje attack to take place is a direct indication of the degree of polymerization or cure of the coating. To be a useful cure according to the practice of this invention, solvent attack must not occur within 15 seconds, and preferably not within 20 seconds, and conversely must occur within 7½ minutes and preferably within 5 minutes. Too rapid an attack by the solvent would indicate that extensive curing is still necessary and too great a time for attack indicates that the coating is not susceptible to further mechanical working, as is a purpose of the present invention. In the examples and the test, the coating was made on a polyethyleneterephthalate film and was 0.2 mil thick when dried.

The active catalysts in the following examples were selected from
A. $(CF_3SO_2)_2CH_2$
B. $(CF_3SO_2)_2CHC_6H_5$
C. $(CF_3SO_2)_2CHBr$
D. Tetraisopropyl titanate
E. Tertrabutyl titanate All active catalysts were introduced as 10% by weight solutions in ethyl acetate except for D and E which was introduced as a liquid.

The epoxy-terminated silanes used in these examples were:

I. γ-glycidoxpropyltrimethoxy silane

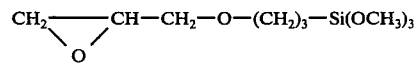

II. a precondensate of I formed by distilling volatiles off from the monomer in the presence of HCL, ethanol and water, and

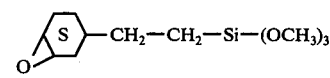
III.

The latent catalysts used were
a. The ammonium salt of A,
b. the morpholine salt of A,
c. the nickel salt of A, and
d. the silver salt of A, each salt being introduced as a 10% by weight solution in ethyl acetate. The results are indicated below. In all examples, 10 grams of the indicated epoxy-terminated silane and 0.2 g of the latent salt catalyst were used.

| Ex | Catalyst (grams sol.) | Reactant (10 grams) | Salt (2 grams) | Time |
|---|---|---|---|---|
| 1 | 2.5 | A | I | a | 6 min |
| 2 | 1.2 | A | I | a | 45 sec |
| 3 | 0.45 | A | I | a | 20 sec |
| 4 | 0.075 | A | I | a | 10 sec |
| 5 | 2.5 | B | I | a | >10 min (too hard) |
| 6 | 1.2 | B | I | a | 60 sec |
| 7 | 0.45 | B | I | a | 45 sec |
| 8 | 0.075 | B | I | a | 30 sec |
| 9 | 2.5 | C | I | a | >10 min (too hard) |
| 10 | 1.2 | C | I | a | 60 sec |
| 11 | 0.45 | C | I | a | 30 sec |
| 12 | 0.075 | C | I | a | 15 sec |
| 13 | 2.5 | D | I | a | >10 min (too hard) |
| 14 | 1.2 | D | I | a | 90 sec |
| 15 | 0.45 | D | I | a | 60 sec |
| 16 | 0.075 | D | I | a | 45 sec |
| 17 | 2.5 | E | I | a | 7 min |
| 18 | 1.2 | E | I | a | 60 sec |
| 19 | 0.45 | E | I | a | 15 sec |
| 20 | 0.075 | E | I | a | 10 sec |
| 21 | 2.5 | A | I | c | >10 min (too hard) |
| 22 | 1.2 | A | I | c | 2 min |
| 23 | 2.5 | B | I | c | >10 min (too hard) |
| 24 | 0.075 | B | I | c | 15 sec |
| 25 | 2.5 | C | I | c | >10 min (too hard) |
| 26 | 0.075 | C | I | c | 20 sec |
| 27 | 2.5 | D | I | c | >10 min (too hard) |
| 28 | 0.075 | D | I | c | 45 sec |
| 29 | 2.5 | E | I | c | 4 min |
| 30 | 0.075 | E | I | c | 15 sec |
| 31 | 1.2 | A | II | a | 2 min |
| 32 | 1.2 | B | II | a | 30 sec |
| 33 | 1.2 | C | II | a | 60 sec |
| 34 | 1.2 | D | II | a | 40 sec |
| 35 | 2.5 | E | II | a | 5 min |
| 36 | 0.075 | E | II | a | 5 sec (too soft) |
| 37 | 1.2 | A | II | d | 2 min |
| 38 | 1.2 | B | II | d | 2 min |
| 39 | 1.2 | C | II | d | 90 sec |
| 40 | 1.2 | D | II | d | 3 min |
| 41 | 2.5 | E | II | d | 3 min |
| 42 | 0.075 | E | II | d | 5 sec (too soft) |
| 43 | 1.2 | A | III | a | 90 sec |
| 44 | 1.2 | B | III | a | 2 min |
| 45 | 1.2 | C | III | a | 2 min |
| 46 | 1.2 | D | III | a | 2 min |
| 47 | 1.2 | E | III | a | 60 min |
| 48 | 1.2 | A | III | b | 90 sec |
| 49 | 1.2 | B | III | b | 2 min |
| 50 | 1.2 | C | III | b | 60 sec |
| 51 | 1.2 | D | III | b | 2 min |
| 52 | 1.2 | E | III | b | 45 sec |

The above examples thoroughly show the relatively proportions of active catalysts necessary to properly cure the epoxy-terminated silane compositions to a degree useful for further processing. Depending upon the activity of the catalyst and the monomer, different proportions of each may be necessary to control the degree of cure. Although the above examples specifically show effects upon homogenous systems, comonomer and copolymer systems of epoxy-terminated silane abrasion resistant compositions, as already known in the art, would clearly be equally useful. Such systems require at least 15% by weight of materials derived from epoxy-terminated silanes, and preferably at least 50% by weight. The remainder of such systems, as known to the prior art, should comprise compatible polymeric additives (less than 10%) and copolymerizable materials up to the maximum limit. Additives will, of course, have varying effects upon the system, but no more than 85% by weight of the system may be a copolymerizable material. Epoxy resins and silanes are the generally preferred comonomers.

The amount of latent catalyst present should be sufficient to render the coating resistant to the solvent attack test for at least 10 minutes.

EXAMPLE 53

The following examples show the utility of the partially cured coating in subsequent shaping operation.

A mixture of 1.2 g tetraisopropyl titanate, 10.0 g γ-glycidoxypropyltrimethoxy silane and 0.12 of the ammonium salt of bis(trifluoromethylsulfonyl)methane in 1.08 g ethyl acetate was knife-coated at 3 mil wet onto 10 mil cellulose acetate butyrate film, cured for 2 minutes at 65° C, then stored for 24 hours at ambient temperature. Dichloromethane was found to attack this coating in 90 seconds.

This coated film was then shaped by pressing and heating, 50–165 lb/in$^2$ pressure and initially 137° C which decreased to 47° C in the pressing duration of 7 minutes. The coating was pressed against a smooth chrome plated backplate and the cellulose acetate butyrate substrate was pressed against a nickel plate of linear echelon lens arrays.

The coating then withstood dichloromethane attack for longer than 10 minutes. The coating was of excellent optical quality.

An identical composition and substrate when shaped after complete curing developed fine cracks and fissures in the coating layer, rendering the composite unsatisfactory.

EXAMPLE 54

A mixture of .12 g bis(tridfluoromethylsulfonyl)-methane, 1.08 g ethyl acetate, 10.0 g of

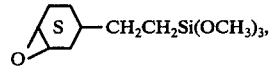

and 2.0 g of the morpholine salt of bis(trifluoromethylsulfonyl)-methane was coated and dried as in Example 53. Dichloromethane solvent attack occurred in 90 seconds. The sheet was molded in a mold for curved goggle lenses under the same pressing conditions used in Example 53. The curved and formed abrasion resistant goggle lenses showed no solvent attack after 10 minutes and displayed excellent optical properties.

An identical composition completely cured prior to pressing displayed fine cracks in the coating layer.

EXAMPLE 55

A mixture of 10 g cellulose acetate butyrate and 0.12 g of the ammonium salt of bis(trifluoromethylsulfonyl)-methane in 1.08 g ethyl acetate was coated and air dried to 0.2 mil thickness on a 10 mil cellulose acetate butyrate film base. A second mixture of 10 g γ-glycidoxypropyltrimethoxy silane and 0.4 g tetraisoporpyl titanate was knife-coated at 3 mil wet thickness and dried for 2 minutes at 65° C. The coating was attacked by dichloromethane in 90 seconds. When subsequently molded as in Examples 53 and 54, the final molded coating resisted the solvent attack for more than 10 minutes, indicating that the catalyst was able to migrate from the heat-softenable binder layer.

What is claimed is:

1. A partially cured film comprising at least 15% by weight of material derived from epoxy-terminated silanes represented by the formulae:

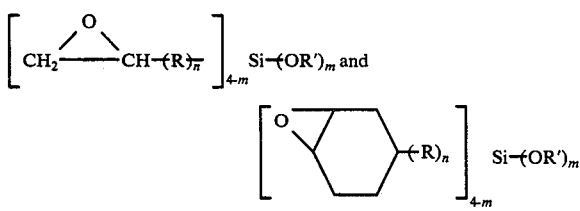

wherein, each R is independently a non-hydrolyzable divalent hydrocarbon radical of less than 20 carbon atoms, or a divalent radical of less than 20 carbon atoms the backbone of which is C atoms which may be interrupted by individual atoms from the group of N and O, the O atoms in the form of either linkages, $m$ is 1, 2, or 3, $n$ is 0, or 1, and R' is aiphatic hydrocarbon radical of less than 10 carbon atoms, an acyl radical of less than 10 carbon atoms, or a radical of the formula $(CH_2CH_2O)_kZ$ in which $k$ is an integer of at least 1, and Z is hydrogen or an aliphatic hydrocarbon radical of less than 10 carbon atoms, said film cured to a degree such that visually observable dichloromethane attack occurs in not less than 15 seconds and no more than seven-and-one-half minutes when 1. a 4.25 cm diameter circle of filter paper is placed on the film,
2. the paper is wetted thoroughly with dichloromethane,
3. a clear plastic cover is placed over the wetted paper, and
4. the time for visually observable attack on the coating is measured, said partially cured film further characterized by having 1. a latent catalyst within the film in sufficient amount so that when delatentized the film will cure to a degree so that the partially cured film will not be attacked by dichloromethane under the above conditions within 10 minutes, or
2. a thermoplastic polymer layer directly bonded thereto, said polymer containing sufficient catalyst therein so that upon heating to a temperature sufficient to allow migration of the catalyst to the partially cured film layer, the partially cured film layer will be cured to a degree sufficient so that the then cured film will not be attacked by dichloromethane under the above conditions within 10 minutes.

2. The partially cured film of claim 1 wherein the latent catalyst is a salt of either a highly fluorinated alkyl sulfonyl acid catalyst or a highly fluorinated alkyl sulfonic acid catalyst.

3. The partially cured film of claim 2 wherein the latent catalyst is an ammonium, organic amine, or metal salt of said acid catalyst.

4. The partially cured film of claim 1 wherein the epoxy-terminated silane has been partially cured in the presence of a metal ester.

5. The partially cured film of claim 4 wherein said metal ester is a titanate ester.

6. The partially cured film of claim 1 wherein said partially cured film is bonded to a substrate.

7. The partially cured film of claim 6 wherein said substrate comprises a thermoplastic resin.

8. The partially cured film of claim 1 wherein the catalyst in said thermoplastic polymer layer bonded to said partially cured film is a highly fluorinated alkyl sulfonyl or sulfonic acid catalyst.

9. A method of forming a shaped abrasion resistant coated article which comprises applying heat and pressure to a partially cured film bonded to a moldable thermoplastic resin said partially cured film comprising at least 15% by weight of material derived from epoxy-terminated silanes represented by the formulae:

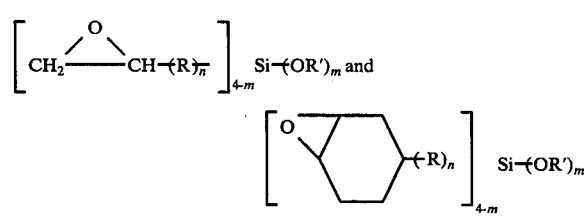

wherein, each R is independently a non-hydrolyzable divalent hydrocarbon radial of less than 20 carbon atoms, or a divalent radical of less than 20 carbon atoms the backbone of which is C atoms which may be interrupted by individual atoms from the group of N and O, the O atoms in the form of ether linkages, $m$ is 1, 2, or 3, $n$ 0, or 1, and R' is an aliphatic hydrocarbon radical of less than 10 carbon atoms, an acyl radical of less than 10 carbon atoms, or a radical of the formula $(CH_2CH_2O)_kZ$ in which $k$ is an integer of at least 1, and Z is hydrogen or an aliphatic hydrocarbon radical of less than 10 carbon atoms, said film cured to a degree such that visually observable dichloromethane attack occurs in not less than 15 seconds and no more than seven-and-one-half minutes when 1. a 4.25 cm diameter circle of filter paper is placed on the film,
2. the paper is wetted thoroughly with dichloromethane,
3. a clear plastic cover is placed over the wetted paper, and
4. the time for visually observable attack on the coating is measured, said partially cured film further characterized by having a latent catalyst within the film in sufficient amount so that when delatentized the film will cure to a degree so that the partially cured film will not be attacked by dichloromethane under the above conditions within 10 minutes and further using means to delatentize said latent catalyst.

10. A method of forming a shaped abrasion resistant coated article which comprises applying heat and pressure to a partially cured film bonded to a moldable thermoplastic resin said partially cured film comprising at least 15% by weight of material derived from epoxy-terminated silanes represented by the formulae:

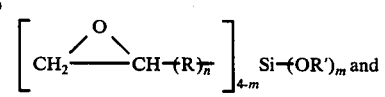

-continued

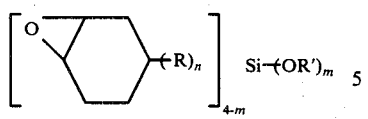

wherein, each R is independently a non-hydrolyzable divalent hydrocarbon radial of less than 20 carbon atoms, or a divalent radical of less than 20 carbon atoms the backbone of which is C atoms which may be interrupted by individual atoms from the group of N and O, the O atoms in the form of ether linkagres, m is 1, 2, or 3, n is 0, or 1, and R' is an aliphatic hydrocarbon radical of less than 10 carbon atoms, an acyl radical of less than 10 carbon atoms, or a radical of the formula $(CH_2CH_2O)_kZ$ in which $k$ is an integer of at least 1, and Z is hydrogen or an aliphatic hydrocarbon radical of less than 10 carbon atoms, said film cured to a degree such that visually observable dichloromethane attack occurs is not less than 15 seconds and no more than seven-and-one-half minutes when 1. a 4.25 cm diameter circle of filter paper is placed on the film,
2. the paper is wetted thoroughly with dichloromethane,
3. a clear plastic cover is placed over the wetted paper, and
4. the time for visually observable attack on the coating is measured, said partially cured film further characterized by having a thermoplastic polymer layer directly bonded thereto, said polymer containing sufficient catalyst therein so that upon heating to a temperature sufficient to allow migration of the catalyst to the partially cured film layer, the partially cured layer will be cured to a degree sufficient so that the then cured film will not be attacked by dichloromethane under the above conditions within 10 minutes, said heat and pressure being sufficient to allow the catalyst to migrate to said partially cured layer and cure said epoxy-terminated silane layer to a degree such that it will withstand dichloromethane attack for more than 10 minutes.

* * * * *

UNITED STATES PATENT OFFICE
CERTIFICATE OF CORRECTION

Patent No. 4,069,368     Dated   January 17, 1978

Inventor(s) Frank L. Deyak and Arthur A. Wegwerth

It is certified that error appears in the above-identified patent and that said Letters Patent are hereby corrected as shown below:

Col. 1, line 10, --of-- should be inserted between "class" and "abrasion".

Col. 1, line 12, "material" should be -- materials--.

Col. 2, line 47, there should be a space between "and" and the two formulae.

Col. 6, line 3, "witbin" should be --within--.

Col. 6, line 17, "tje" should be --the--.

Col. 6, line 63, "each salt. . ." should start a new line.

Col. 7, line 50, "exampls" should be --examples--.

Col. 7, line 50, "relatively" should be --relative--.

Col. 8, line 35, "bis(tridfluoromethylsulfonyl)-methane" should be --bis(trifluoromethylsulfonyl)-methane--.

UNITED STATES PATENT AND TRADEMARK OFFICE
CERTIFICATE OF CORRECTION

PATENT NO. : 4,069,368
DATED : January 17, 1978
INVENTOR(S) : Frank L. Deyak and Arthur A. Wegwerth It is certified that error appears in the above-identified patent and that said Letters Patent are hereby corrected as shown below:

Claim 1, col. 9, line 19, "either" should be --ether--.

Claim 10, col. 12, line 1, "is" should be --in--.

Signed and Sealed this

Twenty-fifth Day of July 1978

[SEAL]

Attest:

RUTH C. MASON
Attesting Officer

DONALD W. BANNER
Commissioner of Patents and Trademarks